United States Patent
Jang et al.

(10) Patent No.: US 9,954,966 B2
(45) Date of Patent: Apr. 24, 2018

(54) METHOD AND APPARATUS FOR DISASTER NOTIFICATION

(71) Applicant: Samsung Electronics Co., Ltd., Gyeonggi-do (KR)

(72) Inventors: Woo Hyuk Jang, Gyeonggi-do (KR); Jae Hyun Park, Gyeonggi-do (KR); Hey Young Park, Seoul (KR); Jong Kyu Bae, Incheon (KR); Yeo Rok Yoon, Gyeonggi-do (KR); Ki Won Lee, Gyeonggi-do (KR); Je Hyun Lee, Seoul (KR); Ki Young Lim, Gyeonggi-do (KR); Jong Yeol Choi, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 202 days.

(21) Appl. No.: 14/806,797

(22) Filed: Jul. 23, 2015

(65) Prior Publication Data
US 2016/0028841 A1    Jan. 28, 2016

(30) Foreign Application Priority Data
Jul. 24, 2014 (KR) .................. 10-2014-0094176

(51) Int. Cl.
*G06F 15/16*  (2006.01)
*H04L 29/08*  (2006.01)
*H04L 29/06*  (2006.01)

(52) U.S. Cl.
CPC .............. *H04L 67/26* (2013.01); *H04L 67/18* (2013.01); *H04L 67/42* (2013.01)

(58) Field of Classification Search
CPC .......... H04L 67/26; H04L 67/42; H04L 67/18
See application file for complete search history.

(56) References Cited

U.S. PATENT DOCUMENTS

| | | |
|---|---|---|
| 8,244,279 B2 | 8/2012 | Dicke et al. |
| 8,831,635 B2 | 9/2014 | Haney |
| 2003/0162557 A1 | 8/2003 | Shida |
| 2006/0053196 A1* | 3/2006 | Spataro ................ H04L 65/403 709/205 |
| 2006/0079200 A1* | 4/2006 | Hirouchi ............ H04L 12/1895 455/404.1 |
| 2006/0223518 A1 | 10/2006 | Haney |
| 2007/0064882 A1 | 3/2007 | Ger et al. |

(Continued)

FOREIGN PATENT DOCUMENTS

| | | |
|---|---|---|
| KR | 10-2009-0036809 A | 4/2009 |
| KR | 10-2009-0126223 A | 12/2009 |
| KR | 10-2011-0131504 A | 12/2011 |

*Primary Examiner* — Michael A Keller
(74) *Attorney, Agent, or Firm* — Cha & Reiter, LLC.

(57) ABSTRACT

A server is provided comprising a processor configured to: receive an indication of a location of a first device that is subscribed to a disaster notification service; in response to receiving a disaster alert, detect that the first device is located in an area associated with the disaster based on the indication of the location of the first device; identify a second device that has registered the first device as a friend; and transmit a first indication of the disaster to the first device and a second indication of the disaster to the second device.

13 Claims, 6 Drawing Sheets

(56) References Cited

U.S. PATENT DOCUMENTS

| | | | |
|---|---|---|---|
| 2007/0165789 A1* | 7/2007 | Hulls | G06Q 10/00 |
| | | | 379/37 |
| 2007/0229549 A1 | 10/2007 | Dicke et al. | |
| 2008/0084473 A1* | 4/2008 | Romanowich | G08B 13/19671 |
| | | | 348/135 |
| 2009/0227239 A1* | 9/2009 | Heen | H04M 3/42357 |
| | | | 455/414.2 |
| 2009/0245477 A1 | 10/2009 | Ger et al. | |
| 2011/0299666 A1 | 12/2011 | Hulls | |
| 2012/0071129 A1 | 3/2012 | Haney | |
| 2012/0289259 A1 | 11/2012 | Dicke et al. | |
| 2014/0164505 A1* | 6/2014 | Daly | H04L 67/02 |
| | | | 709/204 |
| 2015/0264523 A1* | 9/2015 | Xu | H04W 4/021 |
| | | | 455/456.3 |
| 2016/0277575 A1* | 9/2016 | Alexander | H04M 3/5166 |

* cited by examiner

METHOD AND APPARATUS FOR DISASTER NOTIFICATION

CLAIM OF PRIORITY

This application claims the benefit under 35 U.S.C. § 119(a) of a Korean patent application filed on Jul. 24, 2014 in the Korean Intellectual Property Office and assigned Serial number 10-2014-0094176, the entire disclosure of which is hereby incorporated by reference.

TECHNICAL FIELD

The present disclosure relates to telecommunications, and more particularly to a method and apparatus for disaster notification.

BACKGROUND

If a disaster situation, such as an earthquake, typhoon, or tsunami occurs, it is important to quickly provide disaster information to a disaster area. If a disaster occurs, the fact that the disaster has occurred is generally notified through a broadcasting medium, such as a radio or TV.

With the recent prevalence of a portable electronic device such as a smart phone, a technology is being developed which quickly provides disaster information through the portable electronic device as well as the broadcasting medium.

A service providing disaster information by using the portable electronic device may check the location of the portable electronic device and then transmit disaster information on the current area, quickly.

A disaster alerting service using a portable electronic device does not provide disaster information on other areas excluding an area where the portable electronic device is currently located or on an area where there is user's acquaintance such as their family or relatives.

SUMMARY

According to one aspect of the disclosure, a server is provided comprising a processor configured to: receive an indication of a location of a first device that is subscribed to a disaster notification service; in response to receiving a disaster alert, detect that the first device is located in an area associated with the disaster based on the indication of the location of the first device; identify a second device that has registered the first device as a friend; and transmit a first indication of the disaster to the first device and a second indication of the disaster to the second device.

According to another aspect of the disclosure, a method is provided comprising: receiving, by a server, an indication of a location of a first device that is subscribed to a disaster notification service; receiving, by the server, a disaster alert that includes an indication of a disaster's location; in response to receiving a disaster alert, detecting that the first device is located in an area associated with the disaster based on the indication of the location of the first device; identifying a second device that has registered the first device as a friend; and transmitting, by the server, a first indication of the disaster to the first device and a second indication of the disaster to the second device.

According to yet another aspect of the disclosure, a non-transitory computer-readable medium storing processor-executable instructions, which when executed by the processor cause the processor to perform a method comprising the steps of: receiving, by a server, an indication of a location of a first device that is subscribed to receive disaster indications from the server; in response to receiving a disaster alert, detecting that the first device is located in an area associated with the disaster based on the indication of the location of the first device; identifying a second device that has registered the first device as a friend; and transmitting a first indication of the disaster to the first device and a second indication of the disaster to the second device.

DETAILED DESCRIPTION

Figure 1:
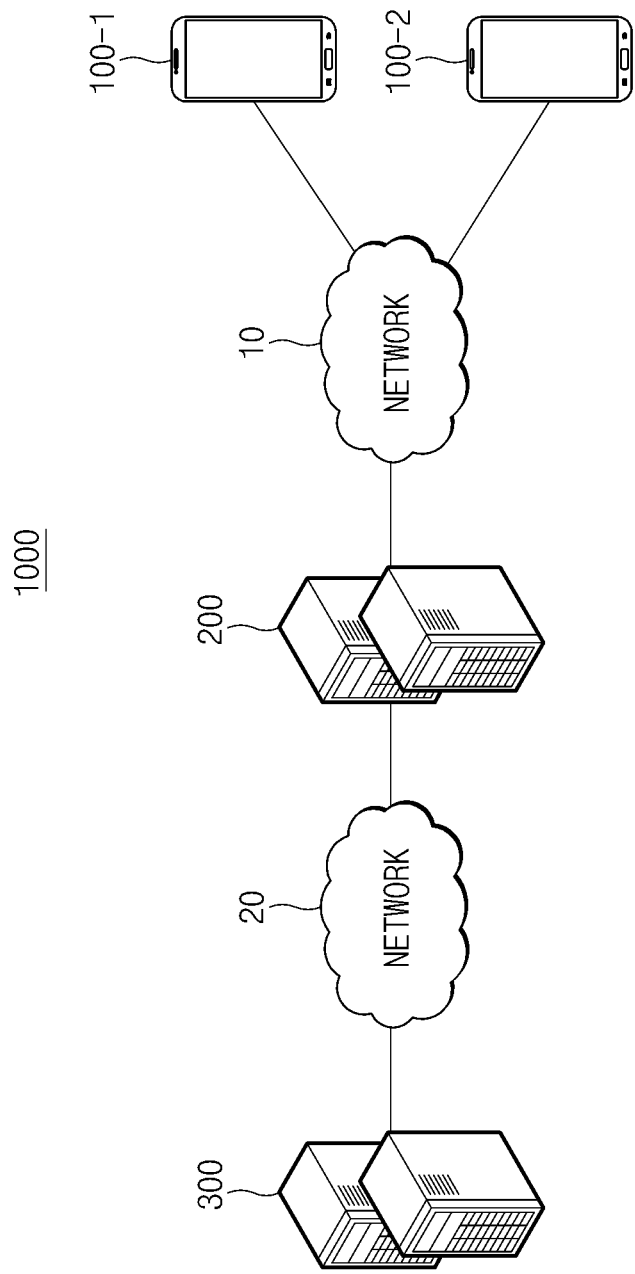
FIG. 1 is a diagram of an example of a disaster alerting system 1000, according aspects of the present disclosure.

The following description with reference to the accompanying drawings is provided to assist in a comprehensive understanding of various embodiments of the present disclosure as defined by the claims and their equivalents. Since the present disclosure may implement various changes and have many embodiments, particular embodiments will be illustrated in the drawings and described in detail in the detailed description. However, it is to be understood that the present disclosure is not limited to particular embodiments and covers all changes, equivalents, and/or replacements that fall within its spirit and technical scope.

The expression "include" or "may include" that may be used in describing the embodiments of the present disclosure indicates the presence of a disclosed corresponding function, operation or component but does not exclude one or more functions, operations or components in addition. Furthermore, in describing the embodiments of the present disclosure, it should be understood that the term "includes" or "has" indicates the presence of characteristics, numbers, steps, operations, components, parts or combinations thereof represented in the present disclosure but does not exclude the presence or addition of one or more other characteristics, numbers, steps, operations, components, parts or combinations thereof.

The expression "or" in the various embodiments of the present disclosure includes any and all combinations of enumerated words. For example, the expression "A or B" may include A, B, or both A and B.

The expression "first", "second", "firstly", or "secondly" in the various embodiments of the present disclosure may modify various components of the various embodiments but does not limit corresponding components. For example, the expressions above do not limit the order and/or importance of corresponding components. The expressions above may be used to distinguish one component from another. For example, both a first user device and a second user device are user devices that are mutually different user devices. For example, the first component may be named as the second component without departing from the scope of a right of various embodiments of the present disclosure, and similarly, the second component may also be named as the first component.

When any component is referred to as being "connected" or "accessed" to another component, it should be understood that the former can be "directly connected" to the latter, or there may be another component in between. On the contrary, when any component is referred to as being "directly connected" or "directly accessed" to another component, it should be understood that there may be no other component in between.

The terms used in describing the various embodiments of the present disclosure are used only to describe specific embodiments and are not intended to limit the various embodiments of the present disclosure. The terms in singular form include the plural form unless otherwise specified.

Unless otherwise defined, all terms used herein including technical or scientific terms have the same meanings as those generally understood by a person skilled in the art.

Terms defined in generally used dictionaries should be construed to have meanings matching contextual meanings in the related art and should not be construed as having an ideal or excessively formal meaning unless otherwise defined herein.

FIG. 1 is a diagram of an example of a disaster alerting system 1000, according aspects of the present disclosure. As illustrated, the disaster alerting system 1000 may include an electronic device 100-1 and 100-2, a disaster alerting server 200, and a disaster management server 300.

According to an embodiment, the electronic device 100-1 and the disaster alerting server 200 may be connected through a network 10. The network 10 may include any suitable type of communication network, such as a mobile communication network (e.g., LTE or 3G network) or the Internet, for example.

The electronic device 100-1 may subscribe to a disaster alerting service. According to an embodiment, the electronic device 100-1 may transmit device identification information (MSISDN, IMEI, IMSI, or the like), a push token for push message transmission, or the like to the disaster alerting server 200 to perform an authentication procedure and then subscribe to the disaster alerting service.

The electronic device 100-1 may transmit an indication of its location to the disaster alerting server 200 after it has subscribed to the disaster alerting service. For example, the electronic device 100-1 may transmit its location to the disaster alerting server 200 at set time intervals. As another example, the electronic device 100-1 may transmit its location to the disaster alerting server 200 when there is a request from the disaster alerting server 200 or when there is a change in location. The electronic device 100-1 may determine its current location by using a built-in location measurement module (e.g., GPS module).

The electronic device 100-1 may register a friend (e.g., the electronic device 100-2) with the disaster alerting service, according to user manipulation. According to an embodiment, the electronic device 100-1 may select the friend from a phone book (or another record) that is stored in the memory of the electronic device 100-1.

Figure 2A:
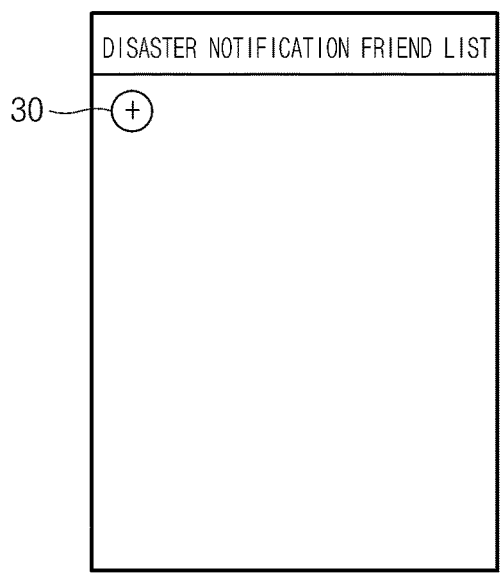
FIG. 2A, FIG. 2B and FIG. 2C are diagrams of a user interface for registering friends with the disaster alerting system of FIG. 1, according to aspects of the disclosure.
Figure 2B:
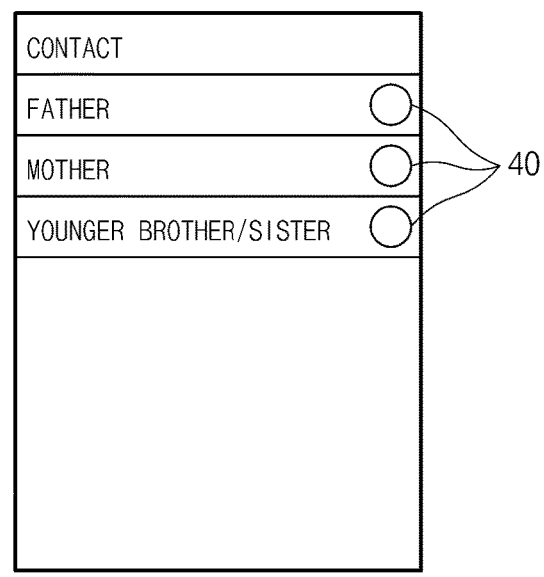
Figure 2C:
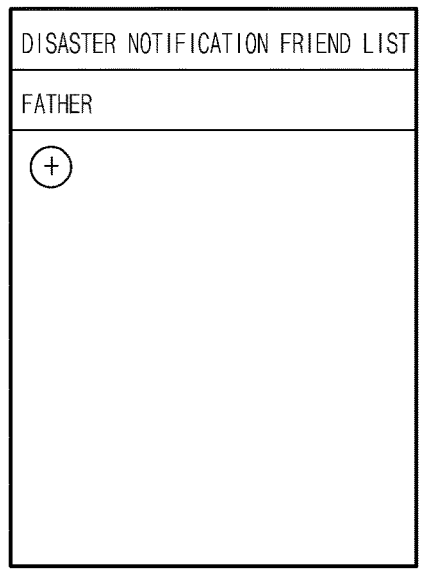

FIGS. 2A-C are diagrams of a user interface for registering friends with the disaster alerting system of FIG. 1, according to aspects of the disclosure.

Referring to FIG. 2A, a disaster alerting friend list may be displayed on an electronic device 100. People added as friends by the user of the electronic device 100 may be displayed on the disaster alerting friend list. A friend add icon 30 may also be provided, as shown. If the friend add icon 30 is selected by, a list of contacts may be displayed as shown in FIG. 2B. According to an embodiment, only the list may identify those contacts who have subscribed the disaster alerting service, from among all contact stored in the electronic device. Adjacently to each contact in the list, the electronic device 100 may display a select icon 40. When the respective select icon 40 of a given contact is selected, that contact may be added to the disaster alerting friend list as shown in FIG. 2C.

When a friend is added to the list of friends, the electronic device 100 may transmit information on an added friend to the disaster alerting server 200. For example, the electronic device 100 may transmit the friend's MSISDN to the disaster alerting server 200. According to an embodiment, the electronic device 100 may not only add a friend but also delete a previously added friend.

The disaster alerting server 200 may receive location information from the electronic device 100 that, and then store the received location information. According to an embodiment, if the location information received from the electronic device 100 is different from previously stored location information, the disaster alerting server 200 may store newly received location information through an update.

The disaster alerting server 200 may store the friend list of the electronic device 100 when friend information is received from the electronic device 100.

The disaster management server 300 may transmit disaster information (e.g., a disaster alert) to the disaster alerting server 200. The disaster information may be transmitted when a disaster occurs, and it may include location information on a disaster area. The disaster alerting server 200 and the disaster management server 300 may be connected through the network 20.

The disaster alerting server 200 may transmit disaster information to an electronic device that has registered the electronic device 100 located at a disaster area as a friend when, the disaster information is received from the disaster management server 300.

Figure 3:
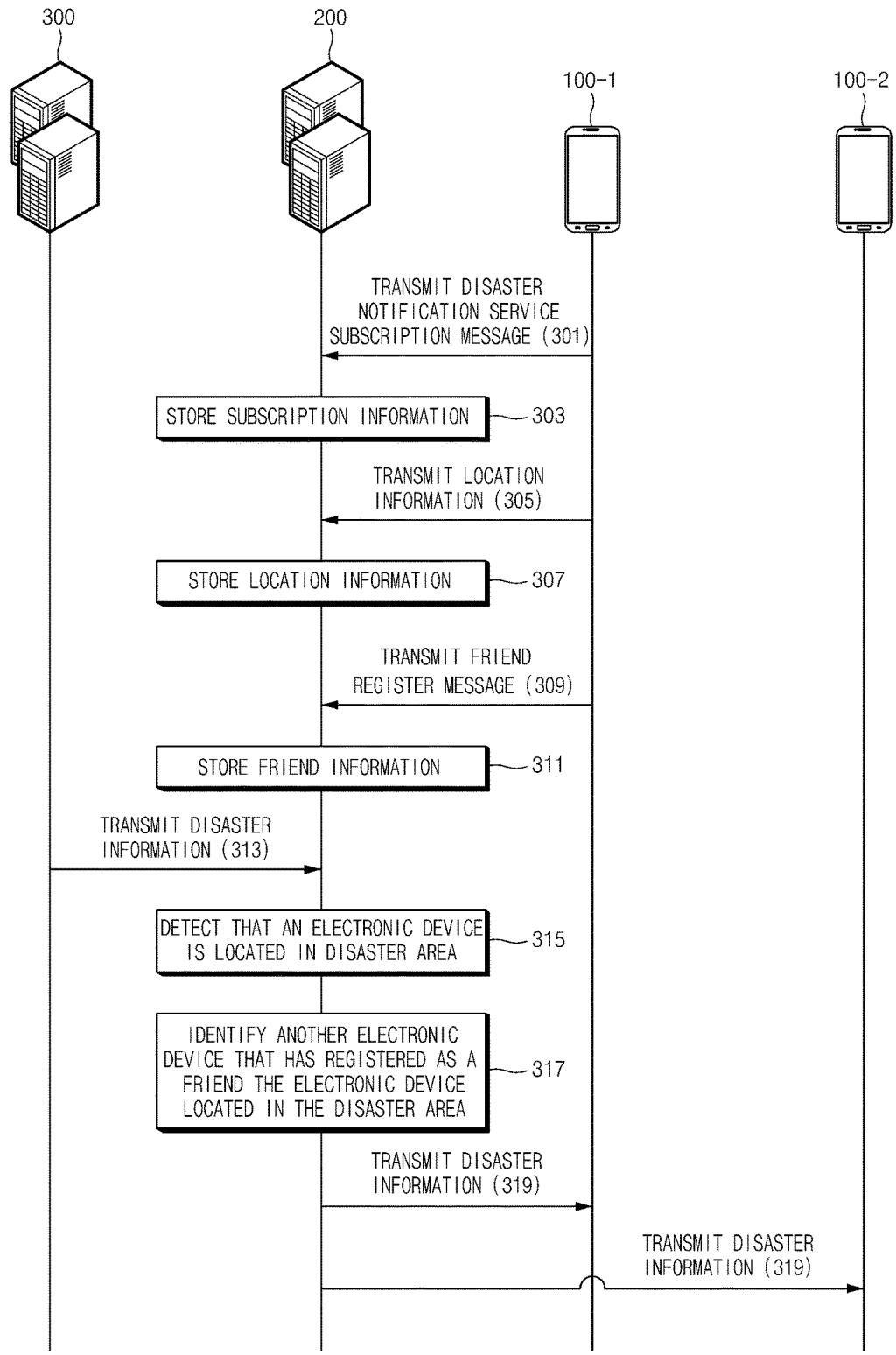
FIG. 3 is sequence diagram of an example of a process for disaster notification, according to aspects of the disclosure.

FIG. 3 is sequence diagram of an example of a process for disaster notification, according to aspects of the disclosure.

In operation 301, the electronic device 100-1 may transmit a service subscription request to the disaster alerting server 200 in operation 301. The service subscription request may include any suitable type of identification information that is associated with the electronic device 100-1, such as Mobile Station International Subscriber Directory Number (MSISDN), International MS Equipment Identity (IMEI), International Mobile Subscriber Identity (IMSI) or the, a push token, etc. The push token may be used in order to identify each device when a push message is transmitted.

In operation 303, the disaster alerting server 200 may store the subscription information received from the first electronic device 100-1. According to an embodiment, the disaster alerting server 200 may include a subscriber DB including subscription information of electronic devices that are subscribed to the disaster alerting service.

In operation 305, the first electronic device 100-1 may transmit location information to the disaster alerting server 200. For example, the first electronic device 100-1 may transmit its location information at designated time intervals. As another example, the first electronic device 100 may transmit location information when there is a request from the disaster alerting server 200 or when there is a change in location.

According to an embodiment, the first electronic device 100-1 may measure latitude/longitude information by using a location measurement module such as a GPS. Additionally or alternatively, the first electronic device 100-1 may convert the measured latitude/longitude information into another format of location information and then transmit the converted information to the disaster alerting server 200. For example, the first electronic device 100-1 may transmit the latitude/longitude information to a location ID management server (not shown) and thus receive a location ID corresponding to the latitude/longitude information. In addition, the received location ID may be transmitted to the disaster alerting server 200. As another example, if transmitting or storing the latitude/longitude information on a specific electronic device is legally restricted, the first electronic device 100-1 may transmit only the latitude/longitude information itself to the disaster alerting server 200 and thus receive the location ID from the ID management server (not shown) through the disaster alerting server 200. Then, the first electronic device 100-1 may transmit, as its location information, the received location ID to the disaster alerting server 200.

In operation 307, the disaster alerting server 200 may store the received location information (e.g., latitude/longitude information or location ID), when location information is received from the first electronic device 100-1. According to an embodiment, the disaster alerting server 200 may convert latitude/longitude information into geohash and then store the geohash when the latitude/longitude information is received from the first electronic device 100-1. Additionally or alternatively, the disaster alerting server 200 may include a location DB including location information on an electronic device that has subscribed to a disaster alerting service.

In operation 309, the first electronic device 100-1 may transmit a friend register message to the disaster alerting server 200 by user manipulation. According to an embodiment, the friend register message may include friend information. For example, the friend information may include an identifier of another device and/or user whom the first electronic device 100-1 would like to be registered as a friend of the first electronic device. As noted above, the identifier may be retrieved by the electronic device 100-1 from a phone book or another similar record stored in the memory of the electronic device 100-1. For example, the friend register message may include the MSISDM of a user whom the first electronic device 100-1 intends to add as a friend.

In operation 311, the disaster alerting server 200 may store friend information on the first electronic device 100-1 when the friend register message is received from the first electronic device 100-1. According to an embodiment, the disaster alerting server 200 may include a friend DB including friend information on an electronic device that has subscribed to a disaster alerting service.

In operation 313, the disaster management server 300 may transmit disaster information to the disaster alerting server 200 when a disaster occurs in a specific area. The disaster information may include the location of a disaster area, the level of a disaster, the radius of the disaster, the type of the disaster, and the like. Disaster location information included in the disaster information may be latitude/longitude information or location ID.

In operation 315, in response to receiving the disaster information, the disaster alerting server 200 may search for an electronic device located in the area of the disaster. According to an embodiment, the disaster alerting server 200 may search for an electronic device located at a disaster area by using a location DB.

In operation 317, if an electronic device located at the disaster area is found, the disaster alerting server 200 may search for an electronic device that has registered as a friend the electronic device located in the area of the disaster. According to an embodiment, the disaster alerting server 200 may search for an electronic device located at a disaster area by using a friend DB.

According to an embodiment, the disaster alerting server 200 may convert location information on the disaster area included in the disaster information into information having the same format as location information stored in the location DB. For example, if the location information on the disaster area is latitude/longitude information and the disaster alerting server 200 stores a location ID, the disaster alerting server 200 may transmit latitude/longitude information on the disaster area to a location ID management server (not shown) and thus receive a corresponding location ID. As another example, if the location information on the disaster area is latitude/longitude information and the disaster alerting server 200 stores geohash, the disaster alerting server 200 may convert the latitude/longitude information on the disaster area into the geohash by using an algorithm.

In operation 319, the disaster alerting server 200 may transmit disaster information to an electronic device located at the disaster area and an electronic device that has registered as a friend the electronic device located at the disaster area. For example, if the first electronic device 100-2 has registered as a friend a second electronic device 100-2 and a disaster occurs in an area where the second electronic device 100-2 is located, it is possible to transmit the disaster information to the first electronic device 100-1 as well as the second electronic device 100-2.

Figure 4:
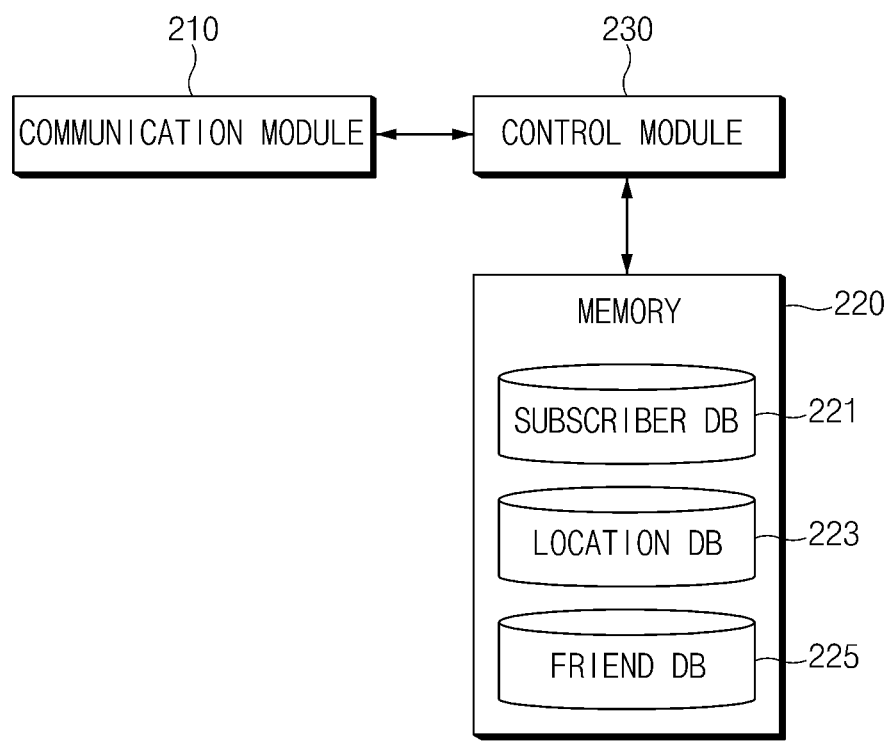
FIG. 4 is diagram of an example of a disaster alerting server, according to aspects of the disclosure.

FIG. 4 is diagram of an example of a disaster alerting server, according to aspects of the disclosure. Referring to FIG. 4, a disaster alerting server 200 may include a communication module 210, a memory 220, and a control module 230.

The communication module 210 may be coupled to at least one electronic device 100 or a disaster management server 300 through a network. In operation, the communication module 210 may receive a disaster alerting service subscription message, location information or a friend register message from at least one electronic device.

In some aspects, the communication module 210 may receive disaster information (e.g., a disaster alert) from a disaster management server 300 when a disaster begins to unfold. In response to receiving the disaster information, the communication module 210 may transmit disaster information to an electronic device, when the electronic device is found to be located in the disaster area, and/or when another electronic device that has registered the electronic device as a friend is found to be located in the disaster area by the control module 230.

According to an embodiment, the communication module 210 may transmit the disaster information in a push mode. For example, it is possible to identify a specific electronic device by using a push token included in subscription information and transmit the disaster information through a push server (not shown).

According to an embodiment, the communication module 210 may transmit the disaster information preferentially to the electronic device located at the disaster area. For example, after the completion of transmission of the disaster information to the electronic device located at the disaster area, it is possible to transmit the disaster information to the electronic device that has registered as the friend the electronic device located at the disaster area.

The memory 220 may include any suitable type of memory, such as Random Access Memory (RAM), Read-Only Memory (ROM), a Solid-State Drive (SSD), a Network-Accessible Storage (NAS) device, and/or cloud storage. The memory 220 may store various pieces of information received from the electronic device 100 or the disaster management server 300. According to an embodiment, the memory 220 may store friend information and location information on an electronic device that has subscribed to a disaster alerting service.

According to an embodiment, the memory 220 may include a subscriber DB 221, a location DB 223, or a friend DB 225. The subscriber DB 221 may store identification information (MSISDN, IMEI, IMSI, or the like) of any given device that has subscribed to the disaster alerting service. The identification information may be mapped to a push token. The location DB 223 may store the location of any electronic device that has subscribed to the disaster alerting service. For any given device that is subscribed with the disaster alerting system, the location DB 223 may map an identifier corresponding to the device to the device's current (e.g., most recently received) location. According to an embodiment, when new location information is received from the electronic device 100, the location DB 223 may update location information on a corresponding electronic device. The friend DB 225 may store friend information on the electronic device that has subscribed to the disaster alerting service. According to an embodiment, the friend DB 225 may map identification information of an electronic device to identification information of another electronic device that the former electronic device has registered as a friend. According to an embodiment, the friend DB 225 may map identification information of an electronic device to another electronic device that has registered the former electronic device as a friend.

The control module 230 may include a processor. The processor may include any suitable type of processing circuitry, such as one or more of a general-purpose processor (e.g., an ARM-based processor), an Application-Specific Integrated Circuit (ASIC), a Field-Programmable Gate Array (FPGA), and/or a Digital Signal Processor (DSP). The control module 230 may control the overall operations of the disaster alerting server 200. The control module 230 may control each of the communication module 210 and the memory 220 in order to provide the disaster alerting service, according to various embodiments of the present disclosure. The control module 230 is particularly described with reference to FIG. 5.

Figure 5:
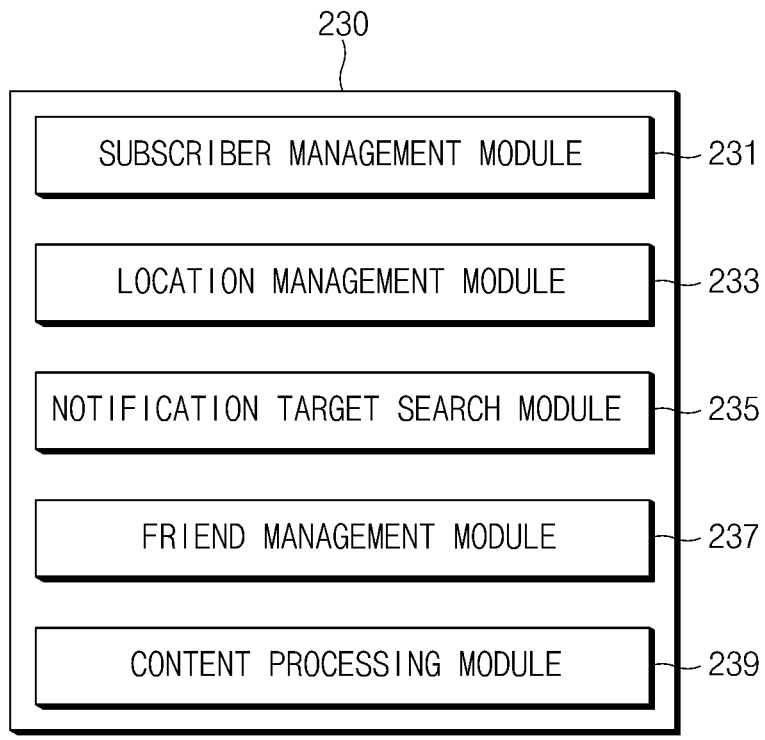
FIG. 5 is a block diagram of an example of a control module, according to aspects of the disclosure.

FIG. 5 is a block diagram of the control module 230, according to aspects of the disclosure. As illustrated, the control module 230 may include a subscription management module 231, a location management module 233, an alerting target search module 235, a friend management module 237, and a content processing module 239.

The subscriber management module 231 may allow an electronic device 100 to subscribe to a disaster alerting service through an authentication procedure when a disaster alerting service subscription message is received from the electronic device 100. The subscriber management module 231 may store subscription information included in the subscription message, in a subscription DB 221.

According to an embodiment, the subscriber management module 231 may search for a push token from the subscriber DB 221 by using identification information (e.g., MSISDM) on the electronic device, when disaster information is transmitted to the electronic device 100.

The location management module 233 may store the received location information in a location DB when location information is received from an electronic device that has subscribed to the disaster alerting service. According to an embodiment, when location information is received from the electronic device, the location management module 223 may update location information stored in the location DB 223.

According to an embodiment, the location management module 233 may convert the location information from one format to another. For example, when latitude/longitude information is received from the electronic device 100, it is possible to convert the latitude/longitude information into geohash and then store the geohash.

According to an embodiment, if location information included in the disaster information received from a disaster management server 300 that has a different format from location information stored in the location DB 223, the location management module 233 may convert the location information included in the disaster information into information having the same format as the location information stored in the location DB 223. For example, if the location information on the disaster area is latitude/longitude information and the location DB 223 stores a location ID, the location management module 233 may transmit latitude/longitude information on the disaster area to a location ID management server (not shown) and thus receive a corresponding location ID. As another example, if the location information on the disaster area is latitude/longitude information and the location DB 223 stores geohash, the location management module 233 may convert the latitude/longitude information on the disaster area into the geohash by using an algorithm.

The alerting target search module 235 may search for an electronic device located at the disaster area when disaster information is received from the disaster management server 300. According to an embodiment, the alerting target search module 235 may determine a disaster information transmission range by using the disaster information such as the location of the disaster area, the level of a disaster, the radius of the disaster, and the type of the disaster. The alerting target search module 235 may search the location DB 223 for electronic devices that are located in the disaster information transmission range. As a result of the search, the alerting target search module 235 may identify the MSISDN of any electronic device that is located in the disaster information transmission range.

The friend management module 237 may store friend information included in a friend register message in the friend DB 225, when the friend register message is received from the electronic device 100. According to an embodiment, the friend management module 237 may modify (or delete) friend information stored in the friend DB 225, when a friend modify (or delete) message is received from the electronic device 100.

According to an embodiment, when an electronic device located at the disaster area is found, the friend management module 237 may use the friend DB 225 to identify an electronic device that has registered as a friend the electronic device located at the disaster area. For example, if the alerting target search module 235 finds the MSISDN of the electronic device located at the disaster area, it is possible to search for the MSISDN of the electronic device that has registered, as a friend, MSISDN found from the friend DB 237.

The content processing module 239 may translate a disaster message to match a subscriber's language when transmitting disaster information. Alternatively, the content processing module 239 may generate disaster information so that disaster information to be transmitted to the electronic device located at the disaster area is different from disaster information to be transmitted to the electronic device that has registered as a friend the electronic device that is located at the disaster area. For example, a message such as "A disaster has occurred, so quickly evacuate." may be transmitted to the electronic device located in the disaster area, and a message such as "A disaster has occurred near the current location of your friend, so contact him or her." may be transmitted to the electronic device that has registered as the friend the electronic device located at the disaster area.

A disaster alerting server according to various embodiments of the present disclosure may include a memory storing respective location information and friend information for with any given electronic device that has subscribed to a disaster alerting service, a control module searching for an electronic device located at a disaster area and an electronic device that has registered as a friend the electronic device located at the disaster area, when disaster information is received from a disaster management server, and a communication module transmitting the disaster information to the electronic device located at the disaster area and to the electronic device that has registered as the friend the electronic device located at the disaster area.

Figure 6:
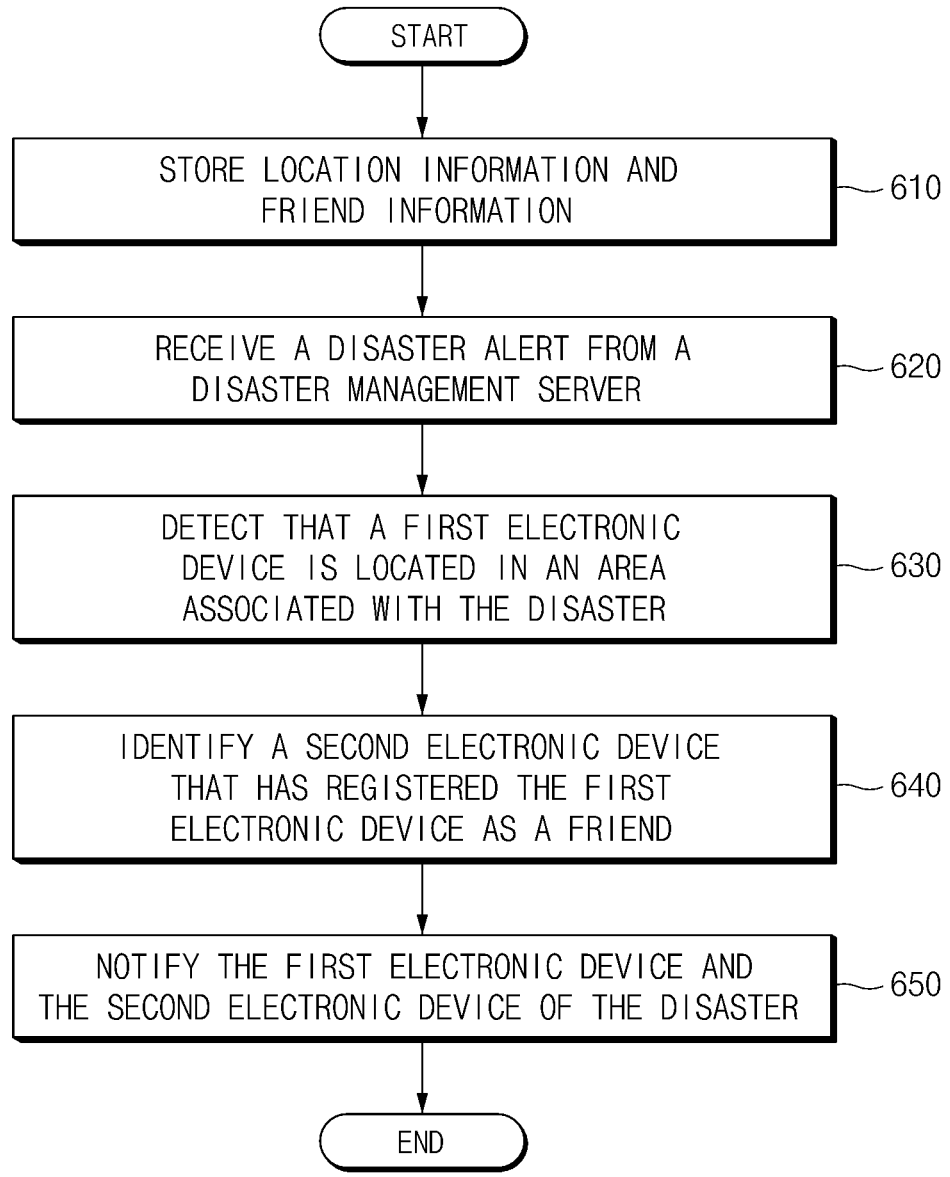
FIG. 6 is a flowchart of an example of a process, according to aspects of the disclosure.

FIG. 6 is a flowchart of an example of a process, according to aspects of the disclosure. In operation 610, the disaster alerting server 200 may store location information and friend information associated with one or more devices that have subscribed to the disaster alerting system. According to an embodiment, the disaster alerting server 200 may store received location information in a location DB when location information is received from an electronic device that has subscribed to a disaster alerting service. For example, the disaster alerting server 200 may map the MSISDN of the electronic device 100 to its current location. According to an embodiment, the disaster alerting server 200 may store friend information in a friend DB when the friend information is received from an electronic device. For example, the disaster alerting server 200 may map the MSISDN of an electronic device and the MSISDN of another electronic device that is registered as a friend by the former electronic device.

In operation 620, the disaster alerting server 200 may receive disaster information (e.g., a disaster alert) from a disaster management server 300. The disaster information may include the location of a disaster area, the level of a disaster, the radius of the disaster, the type of the disaster, and the like.

According to an embodiment, if the location information included in the disaster information received from the disaster management server 300 has a different format from the location information stored in the location DB, the disaster alerting server 200 may convert the location information included in the disaster information into information having the same format as the location information stored in the location DB. For example, if the location information on the disaster area is latitude/longitude information and the location DB stores a location ID, the location management module 233 may transmit latitude/longitude information on the disaster area to a location ID management server (not shown) and thus receive a corresponding location ID. As another example, if the location information on the disaster area is latitude/longitude information and the location DB stores geohash, the location management module 233 may convert the latitude/longitude information on the disaster area into the geohash by using an algorithm.

In operation 630, the disaster alerting server 200 may identify a first electronic device that is located in an area associated with the disaster. According to an embodiment, the disaster alerting server 200 may determine a disaster information transmission range by using the disaster information. Afterwards, the disaster alerting server 200 may search the location DB 223, for any subscriber devices that might be located in the disaster information transmission range. As a result of the search, the disaster alerting server 200 may identify the MSISDN of any electronic device located in the disaster information transmission range.

In operation 640, the disaster alerting server 200 may identify a second electronic device that has registered the first electronic device as a friend. For example, the disaster alerting server 200 may search the friend DB 225 for any devices that have registered the first electronic device as a friend. More specifically, if the MSISDN of the first electronic device is found, the disaster alerting server 200 may use its MSISDN to search the friend DB 225 for the MSISDN of an electronic device that has registered the first electronic device as a friend.

In operation 650, the disaster alerting server 200 may notify the first and second electronic devices of the disaster. For example, the disaster alerting server may transmit a first indication of the disaster to the first electronic device and a second indication of the disaster to the second electronic device. According to an embodiment, the disaster alerting server 200 may transmit the disaster information in a push mode. For example, the disaster alerting server 200 may use identification information of the electronic device to retrieve a push token associated with the first electronic device from a subscriber DB. The disaster alerting server may then use the push token to transmit the first indication of the disaster to the first electronic device. The disaster alerting server 200 may search for the push token from the subscriber DB by using the MSISDN of the first electronic device.

According to an embodiment, the disaster alerting server 200 may transmit the disaster information preferentially to the first electronic device because it is located in the disaster area. For example, the second indication of the disaster may transmitted to the second electronic device only after the transmission of the first indication of the disaster to the first electronic device is completed.

A disaster alerting method of a disaster alerting server according to various embodiments of the present disclosure may include storing location information and friend information on an electronic device that has subscribed to a disaster alerting service, searching for an electronic device located at a disaster area and another electronic device that has registered as a friend the electronic device located at the disaster area, when disaster information is received from a disaster management server, and transmitting the disaster information to the electronic device located at the disaster area and to the electronic device that has registered as friend the electronic device located at the disaster area.

The disaster alerting method of the disaster alerting server according to various embodiments of the present disclosure as described above may be implemented in a program executable by the disaster alerting server. In addition, the program may be stored and used in various types of recording mediums.

In particular, program codes for performing the above-described methods may be stored in various types of non-volatile recording mediums such as a flash memory, a read-only memory (ROM), an erasable programmable ROM (EPROM), an electronically erasable and programmable ROM (EEPROM), a hard disk, a removable disk, a memory card, an USB memory, and a CD-ROM.

A computer readable recording medium according to various embodiments of the present disclosure may include a program executing a method including storing location information and friend information on an electronic device that has subscribed to a disaster alerting service, searching for an electronic device located at a disaster area and another electronic device that has registered as a friend the electronic device located at the disaster area, when disaster information is received from a disaster management server, and transmitting the disaster information to the electronic device located at the disaster area and to the electronic device that has registered as the friend the electronic device located at the disaster area.

According to various embodiments of the present disclosure, a user that uses a disaster alerting service may, in real time, receive disaster information on a location where there is acquaintances such as his or her families, relatives, or friends that the user have registered as friends, as well as a location where there is the user.

Also, even if a person registered as the friend is out of their usual living base due to a travel or the like, it is possible to receive disaster information that reflects the actual location of the person registered as the friend, in real time.

FIGS. 1-6 are provided as an example only. At least some of the steps discussed with respect to these figures can be performed concurrently, performed in a different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

While the present disclosure has been particularly shown and described with reference to the examples provided therein, it will be understood by those skilled in the art that various changes in form and details may be made therein without departing from the spirit and scope of the present disclosure as defined by the appended claims.

What is claimed is:

1. An electronic device, comprising:
a memory storing a database for mapping a location of a first device to a Mobile Station International Subscriber Directory Number (MSISDN) of the first device; and
one or more processors configured to:
receive an indication of the location of the first device that is subscribed to a disaster notification service;
receive friend information corresponding to one or more devices subscribed to the disaster notification service for storage in the memory;
in response to receiving a disaster alert, detect that the first device is located in an area associated with the disaster based on the indication of the location of the first device;
using the friend information, retrieving at least one second device by identifying any devices indicating that the a user of the first device is registered as a friend; and
transmit a first indication of the disaster to the first device and a second indication of the disaster to the retrieved at least one second device,
wherein the disaster alert includes an indication of a disaster location, and detecting that the first device is located in the area associated with the disaster includes performing a search of the database based on the disaster location and retrieving the MSISDN of the first device as a result of the search,
wherein the friend information is utilized to map the first device to the at least one second device, based on the at least one second device indicating that the user of the first device is registered as a friend to a user of the at least one second device, and
wherein the one or more processors are configured to generate a location ID or a qeohash when the location ID or geohash is not included in the disaster alert.

2. The electronic device of claim 1, further comprising a memory storing a database mapping an identifier corresponding to the at least one second device to respective identifiers of the one or more at least one devices that the at least one second device has registered as friends, wherein identifying the at least one second device includes performing a search of the database.

3. The electronic device of claim 1, further comprising a memory storing a database mapping an identifier of the first device to a token, wherein the one or more processors are further configured to retrieve the token from the database, and the first indication of the disaster is transmitted to the first device based on the token.

4. The electronic device of claim 1, wherein the first indication of the disaster is transmitted before the second indication of the disaster.

5. The electronic device of claim 1, wherein the disaster alert includes at least one of coordinates associated with the disaster, the location ID associated with the disaster, and the geohash associated with the disaster.

6. The electronic device of claim 1, wherein indication of the location of the first device includes at least one of coordinates of the device, a location ID, and geohash.

7. A method in an electronic device, comprising:
storing in a memory a database for mapping a location of a first device to a Mobile Station International Subscriber Directory Number (MSISDN) of the first device;
receiving an indication of the location of the first device that is subscribed to a disaster notification service;
receiving friend information corresponding to one or more devices subscribed to the disaster notification service for storage in a memory;
in response to receiving a disaster alert, detecting by a processor that the first device is located in an area associated with the disaster based on the indication of the location of the first device;
using the friend information, retrieving at least one second device by identifying any devices indicating that the a user of the first device is registered as a friend; and
transmitting a first indication of the disaster to the first device and a second indication of the disaster to the retrieved at least one second device,
wherein the disaster alert includes an indication of a disaster location, and detecting that the first device is located in the area associated with the disaster includes performing a search of the database based on the disaster location and retrieving the MSISDN of the first device as a result of the search,
wherein the friend information is utilized to map the first device to the at least one second device, based on the at least one second device indicating that the user of the first device is registered as a friend to a user of the at least one second device, and
wherein the processor is configured to generate a location ID or a geohash when the location ID or qeohash is not included in the disaster alert.

8. The method of claim 7, wherein identifying the at least one second device includes performing a search of a database that maps an identifier corresponding to the at least one second device to respective identifiers of one or more other devices that the at least one second device has registered as friends.

9. The method of claim 7, further comprising, retrieving a token from a database that maps an identifier of the first device to the token, wherein the first indication of the disaster is transmitted based on the token.

10. The method of claim 7, wherein the first indication of the disaster is transmitted before the second indication of the disaster.

11. The method of claim 7, wherein the disaster alert includes at least one of coordinates associated with the disaster, the location ID associated with the disaster, and the geohash associated with the disaster.

12. The method of claim 7, wherein indication of the location of the first device includes at least one of coordinates of the device, a location ID, and geohash, and
wherein a list of devices is generated on the at least one second device via selection of desired contacts from a list of all contacts stored on the at least one second device.

13. A non-transitory computer-readable medium storing processor-executable instructions, executable by the processor to perform:
storing in a memory a database for mapping a location of a first device to a Mobile Station International Subscriber Directory Number (MSISDN) of the first device;
receiving an indication of a location of the first device that is subscribed to receive disaster indications;
receiving receive friend information corresponding to one or more devices subscribed to the a disaster notification service for storage in a memory;
in response to receiving a disaster alert, detecting that the first device is located in an area associated with the disaster based on the indication of the location of the first device;
using the friend information, retrieving at least one second device by identifying any devices indicating that the a user of the first device is registered as a friend; and
transmitting a first indication of the disaster to the first device and a second indication of the disaster to the second device,
wherein the disaster alert includes an indication of a disaster location, and detecting that the first device is located in the area associated with the disaster includes performing a search of the database based on the disaster location and retrieving the MSISDN of the first device as a result of the search,
wherein the friend information is utilized to map the first device to the at least one second device, based on the at least one second device indicating that the user of the first device is registered as a friend to a user of the at least one second device, and
wherein the one or more processors are configured to generate a location ID or a qeohash when the location ID or qeohash is not included in the disaster alert.

* * * * *